(12) United States Patent
Laflamme

(10) Patent No.: US 11,964,813 B2
(45) Date of Patent: Apr. 23, 2024

(54) EGG CARTON AND FORMATION APPARATUS AND METHOD

(71) Applicant: Consider Provisions, LLC, Monroe, NH (US)

(72) Inventor: Jesse Laflamme, Hanover, NH (US)

(73) Assignee: Consider Provisions, LLC, Monroe, NH (US)

(*) Notice: Subject to any disclaimer, the term of this patent is extended or adjusted under 35 U.S.C. 154(b) by 225 days.

(21) Appl. No.: 17/472,863

(22) Filed: Sep. 13, 2021

(65) Prior Publication Data

US 2022/0081195 A1   Mar. 17, 2022

Related U.S. Application Data

(60) Provisional application No. 63/077,845, filed on Sep. 14, 2020.

(51) Int. Cl.
| | | |
|---|---|---|
| *B65D 85/32* | (2006.01) | |
| *B29C 69/00* | (2006.01) | |
| *B29L 31/00* | (2006.01) | |
| *D21J 1/10* | (2006.01) | |
| *D21J 3/12* | (2006.01) | |

(52) U.S. Cl.
CPC ............ *B65D 85/324* (2013.01); *B29C 69/00* (2013.01); *D21J 1/10* (2013.01); *D21J 3/12* (2013.01); *B29L 2031/7168* (2013.01)

(58) Field of Classification Search
CPC .......... B29L 2031/7168; B65D 85/325; B65D 85/324; B29C 69/00; D21J 1/10; D21J 3/12

USPC ............ 206/521, 521.1, 521.3, 521.15
See application file for complete search history.

(56) References Cited

U.S. PATENT DOCUMENTS

| | | | | |
|---|---|---|---|---|
| 1,083,512 A | * | 1/1914 | Wilson | B65D 85/327 |
| | | | | 229/120.34 |
| 1,327,946 A | | 1/1920 | Coyle | |
| 1,768,024 A | * | 6/1930 | Benoit | B65D 85/327 |
| | | | | 229/120.04 |

(Continued)

FOREIGN PATENT DOCUMENTS

| | | |
|---|---|---|
| GB | 373 393 A | 5/1932 |
| GB | 419 794 A | 11/1934 |

(Continued)

OTHER PUBLICATIONS

International Preliminary Report on Patentability for International Application No. PCT/US2021/049999, dated Mar. 23, 2023.

(Continued)

*Primary Examiner* — Rafael A Ortiz
(74) *Attorney, Agent, or Firm* — Wolf, Greenfield & Sacks, P.C.

(57) ABSTRACT

An egg carton and method and apparatus for forming an egg carton. A main body of the egg carton may be made of a single sheet of material and folded or otherwise bent to form the majority of the carton's interior space. Partition walls may be engaged with slots formed in the main body to define separate storage areas of the interior space as well as help hold the main body in the desired configuration. Hooks on the sides of the partition walls may engage with openings in the main body to secure the main body to the partition walls.

27 Claims, 15 Drawing Sheets

(56) References Cited

U.S. PATENT DOCUMENTS

| | | | |
|---|---|---|---|
| 1,793,026 A | | 2/1931 | Sugarman |
| 1,880,074 A | | 9/1932 | Coyle |
| 1,913,441 A | | 6/1933 | Guyer |
| 2,013,606 A | * | 9/1935 | Hale .................... B65D 85/327 |
| | | | 229/120.04 |
| 2,047,495 A | | 7/1936 | Schurmann |
| 2,078,430 A | * | 4/1937 | Walsh .................. B65D 85/327 |
| | | | 229/120.04 |
| 2,134,763 A | | 11/1938 | Lawless |
| 2,382,202 A | | 8/1945 | Buttery |
| 2,933,227 A | | 4/1960 | Vahle |
| 3,018,936 A | * | 1/1962 | Rodriguez ........... B65D 85/327 |
| | | | 206/521.1 |
| 3,047,202 A | | 7/1962 | Schaefer |
| 5,344,023 A | | 9/1994 | Cox et al. |

FOREIGN PATENT DOCUMENTS

| | | |
|---|---|---|
| GB | 501916 A | 3/1939 |
| GB | 614218 A | 12/1948 |
| GB | 972552 A | 10/1964 |

OTHER PUBLICATIONS

Invitation to Pay Additional Fees for International Application No. PCT/US2021/049999, dated Dec. 22, 2021.

International Search Report and Written Opinion for International Application No. PCT/US2021/049999, dated Feb. 14, 2022.

PCT/US2021/049999, Dec. 22, 2021, Invitation to Pay Additional Fees.

PCT/US2021/049999, Feb. 14, 2022, International Search Report and Written Opinion.

* cited by examiner

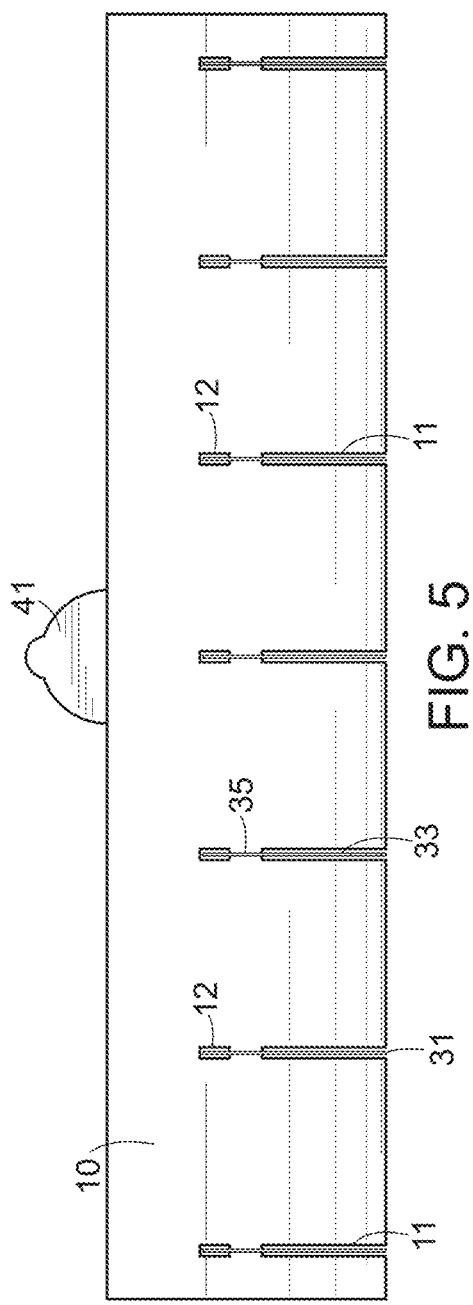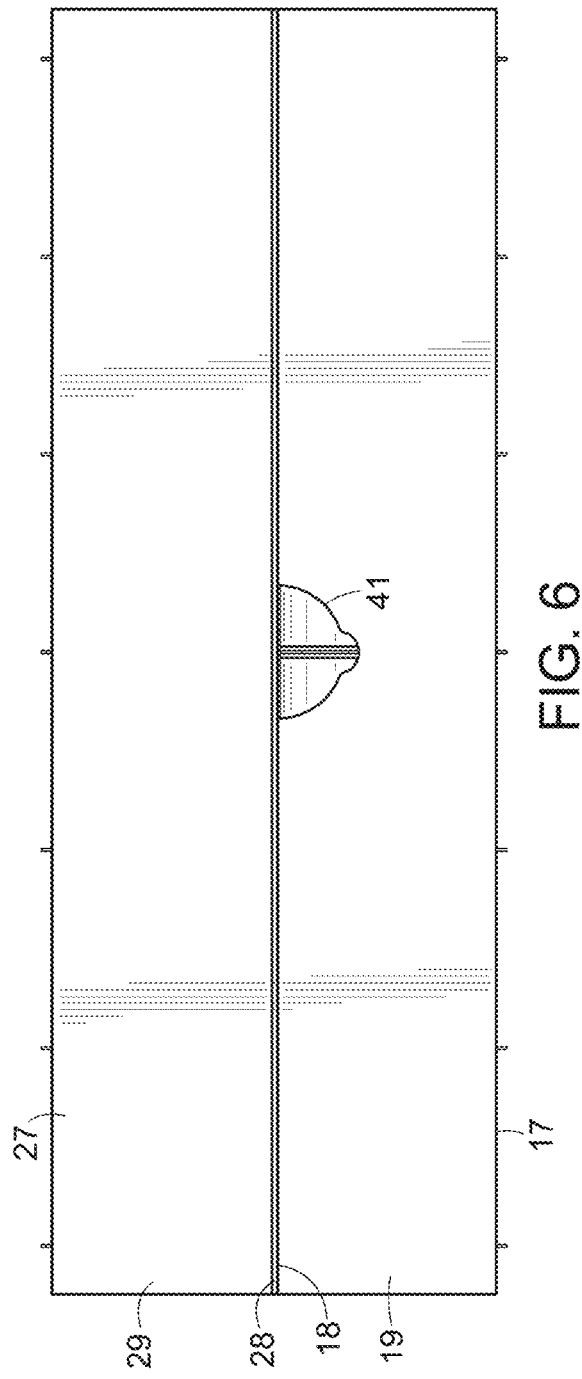

EGG CARTON AND FORMATION APPARATUS AND METHOD

RELATED APPLICATION

This application claims priority under 35 U.S.C. § 119(e) to U.S. Provisional Application Ser. No. 63/077,845, filed on Sep. 14, 2020, which is herein incorporated by reference in its entirety.

BACKGROUND

1. Field of Invention

Methods and apparatus related to egg cartons are described.

2. Related Art

Egg cartons have long been known for holding eggs and other items, e.g., as shown in U.S. Pat. Nos. 2,013,606, 1,327,946, 1,768,024 and GB419794.

SUMMARY

In some embodiments, an egg carton includes a main body formed from a sheet of material, such as a planar sheet of paper, cardboard, plastic, etc. The sheet can be rectangular with first and second side edges and first and second end edges. A center fold line can be parallel to the first and second side edges, and a first bottom fold line can be between the center fold line and the first side edge, e.g., such that the main body has a first inner panel between the first bottom fold line and the center fold line. A second bottom fold line can be between the center fold line and the second side edge, e.g., such that the main body has a second inner panel between the second bottom fold line and the center fold line. In some cases, the first and second bottom fold lines can be parallel to the center fold line. A first upper fold line can be between the first bottom fold line and the first side edge, e.g., such that the main body has a first outer panel between the first upper fold line and the first bottom fold line. Similarly, a second upper fold line can be between the second bottom fold line and the second side edge, e.g., such that the main body has a second outer panel between the second upper fold line and the second bottom fold line. In some cases, the first and second upper fold lines can be parallel to the center fold line. A plurality of first slots, e.g., elongated, narrow openings, can be formed in the sheet and extend parallel to the first and second end edges, e.g., such that the first slots are formed in the first inner and outer panels between the center fold line and the first upper fold line so as to extend across the first bottom fold line. Similarly, a plurality of second slots can be formed in the sheet and extend parallel to the first and second end edges, e.g., such that the second slots are formed in the second inner and outer panels between the center fold line and the second upper fold line so as to extend across the second bottom fold line. A plurality of first openings can be formed in the first outer panel and located between a corresponding one of the plurality of first slots and the first upper fold line, e.g., so that each of the plurality of first openings is adjacent an outer end of a corresponding first slot. A plurality of second openings can be formed in the second outer panel and located between a corresponding one of the plurality of second slots and the second upper fold line, e.g., so that each of the plurality of second openings is adjacent an outer end of a corresponding second slot. A plurality of partition walls can each be formed from a sheet of material and have a bottom, first and second sides, and a top. The first and second sides can each have a respective first and second hook, and the top can have a groove extending from the top toward the bottom. The main body and partition walls can be assembled to form an egg carton, as described more below.

In some embodiments, the main body is folded downwardly at the center fold line to form a vertically-oriented 180 degree bend, and each of the plurality of partition walls can be positioned within a corresponding one of the first and second slots such that a portion of the vertically-oriented 180 degree bend is received in the groove. The main body can be folded upwardly at the first and second bottom fold lines such that the first inner and outer panels define a concave-up shape (e.g., a "U" shape), and such that the second inner and outer panels define a concave-up shape (e.g., a "U" shape). In this arrangement, the first and second inner and outer panels can together define a "W" shape when viewed from a longitudinal end of the carton. In some cases, the bottom of each of the partition walls can be located below the main body, e.g., such that the bottom of the partition walls defines a lower surface of the carton. An end of the first and second hooks of each of the partition walls can be respectively engaged with a corresponding first and second opening, e.g., so that the first and second hooks engage the first and second outer panels, respectively, so as to resist movement of the first and second outer panels away from the vertically oriented 180-degree bend. In some cases, an outermost end of each first slot is received into a gap between a corresponding first hook and partition wall, and an outermost end of each second slot is received into a gap between a corresponding second hook and partition wall. With the outermost ends of the first and second slots received in a corresponding gap, an end of the first and second hooks of each of the partition walls can be respectively engaged with a corresponding first and second opening. As a result, the partition walls can help hold the main body in the "W" shape.

In some cases, the first inner and outer panels and the second inner and outer panels define an interior space of the carton, and the bottom and lower sections of the first and second sides of the partition walls are positioned outside of the interior space. The first and second hooks of each of the partition walls can be positioned outside of the interior space and have an end of the first and second hooks extend through a corresponding first or second opening and into the interior space.

In some embodiments, the first inner and outer panels and the second inner and outer panels define an interior space having an upper opening, and the main body is folded inwardly at the first and second upper fold lines to define first and second lid portions positionable over the upper opening. The first and second lid portions can additionally include a lid fold line, and the first and second lid portions can be folded inwardly at the lid fold lines such that the first and second side edges are received into the groove of the plurality of partition walls. This can help hold the lid portions in place in a closed position over the upper opening of the interior space of the carton. The groove of the plurality of partition walls can flare outwardly and upwardly at the top of the partition wall, e.g., to aid in receiving the 180 degree bend and/or the side edges into the groove.

In some embodiments, a method of forming an egg carton includes folding a main body sheet along center line to form a 180 degree bend and such that a plurality of first slots and a plurality of second slots are on opposite sides of the 180 degree bend. Each of a plurality of partition walls can be extended through a corresponding pair of first and second slots, and a portion of the 180 degree bend received into a groove formed in a top of each of the partition walls. Hooks on first and second sides of each partition wall can be engaged with corresponding first and second openings formed in the main body sheet adjacent a corresponding first and second slot such that the main body defines an interior space. In some cases, the main body sheet can define a "W" shape for the interior space. Partition walls can extend across the "W" shape and further define separate storage areas in the interior space.

In some embodiments, first and second outer panels of the main body sheet can be bent outwardly and toward a top of the partition walls such that the first and second hooks extend outwardly relative to the first and second outer panels, respectively. Ends of the first and second hooks can be extended into the corresponding first and second openings such that the partition walls hold the first and second outer panels from moving away from the 180 degree bend. For example, an outermost end of the first slots can be extended into a gap between a corresponding first hook and partition body, and an outermost end of the second slots can be extended into a gap between a corresponding second hook and partition body. First and second lid portions of the main body can be folded to position the first and second lid portions over the tops of the partition walls and to enclose an interior space defined by the main body sheet.

In some embodiments, a carton forming machine includes a lower mold with opposed first and second sidewalls extending in a longitudinal direction and defining a cavity. The first and second sidewalls can include a plurality of channels each arranged to receive a partition wall of a carton and extending between the first and second sidewalls, e.g., in a direction perpendicular to the longitudinal direction. An upper mold can have an insertion portion arranged to move into the cavity to push a main body of the carton into the cavity such that partition walls in the plurality of channels are received through a corresponding slot in the main body. As a result, the forming machine can simplify assembly of a carton because partition walls can be simply and easily engaged with the carton main body by pushing the main body downwardly onto the partition walls.

In some embodiments, a folding bar extends in the longitudinal direction between the first and second sidewalls and is arranged to fold the main body over the folding bar as the upper mold pushes the main body into the cavity. For example, the folding bar and the upper mold can be arranged to fold the main body over the folding bar to form a vertically oriented 180-degree bend. Thus, the main body can be provided to the forming machine in a flat, planar form, and the machine can fold the main body to define the interior space of the carton, e.g., in a single operation. In some embodiments, the folding bar is arranged to move with the upper mold in a portion of a range of movement of the upper mold toward the lower mold. For example, the folding bar can be resiliently biased, e.g., by a spring or pneumatic actuator, to move upwardly and the upper mold can be arranged to contact the folding bar and cause the folding bar to move with the upper mold when pushing the main body into the cavity. This can allow the machine to form the 180 degree bend and then insert portions of the main body into the lower mold cavity.

In some embodiments, the lower mold includes a center wall between the first and second sidewalls and extending in the longitudinal direction, e.g., the center wall can be arranged between first and second cavity portions of the cavity. In some cases, the center wall with first and second sidewalls can define the cavity to have a W-shape in a cross-section perpendicular to the longitudinal direction. The center wall can have a plurality of channels each arranged to receive a portion of a partition wall extending between the first and second sidewalls. In some cases, the upper mold includes first and second insertion portions arranged to be received into the first and second cavity portions, respectively, with the first and second insertion portions being separated by a gap into which a portion of the center wall is received when the upper mold is fully inserted into the cavity. The upper mold can include a plurality of first insertion portions and a plurality of second insertion portions, with adjacent ones of the first insertion portions arranged to receive a partition wall between the adjacent ones of the first insertion portions when the upper mold is fully inserted into the cavity, and adjacent ones of the second insertion portions arranged to receive a partition wall between the adjacent ones of the second insertion portions when the upper mold is fully inserted into the cavity. As a result, each of the insertion portions can be inserted into a separate storage portion or area of the interior space of the carton. The first and second insertion portions can each include inner and outer resilient elements, with the outer resilient elements arranged to contact a respective sidewall of the lower mold and the inner resilient elements arranged to contact the center wall when the upper mold is fully inserted into the cavity. This can help ensure that the main body of the carton is suitably formed into a desired shape. The first and second insertion portions can each include a lowermost portion having a pointed end arranged to push a corresponding fold line portion of the main body (e.g., a first or second bottom fold line) into a corresponding recess of the cavity.

In some embodiments, a method of forming a carton includes providing a plurality of partition walls of a carton in a cavity of a carton forming machine, e.g., by positioning each partition wall in a channel of a lower mold that defines the cavity. A main body of the carton made of a sheet material can be inserted into the cavity so that the plurality of partition walls in the cavity are received into a corresponding one of a plurality of slots formed in the sheet material of the main body. For example, the main body can be provided in a flat state over the cavity after the plurality of partition walls are provided in the cavity and before the main body is inserted into the cavity. Each of the plurality of partition walls can be planar and arranged in the cavity in a direction perpendicular to a direction in which the main body is inserted into the cavity. Thus, the partition walls can be vertically oriented and pass through one or more corresponding slots of the main body as the main body is pushed into the cavity. After insertion of the main body into the cavity, the main body can define an interior space of the carton with the plurality of partition walls at least partially positioned in the interior space. For example, the cavity can extend longitudinally, and the main body can define a "U" or "W" shape when viewed from a longitudinal end. The partition walls can extend across the interior space perpendicularly to the longitudinal direction. Partition walls can in some cases form an end wall of the carton.

In some embodiments, hooks on the plurality of partition walls are engaged with corresponding openings formed in the sheet material of the main body as the main body is inserted into the cavity. The main body can be folded to form a vertically oriented 180-degree bend, e.g., along a center fold line of the main body. The vertically oriented 180-degree bend can be positioned in a corresponding groove of each of the plurality of partition walls. For example, respective portions of the plurality of partition walls can be inserted through a corresponding one of a plurality of first slots formed in the main body on a first side of the 180-degree bend and through a corresponding one of a plurality of second slots formed in the main body on a second side of the 180-degree bend. Hooks on the plurality of partition walls can be engaged with corresponding openings formed in the sheet material of the main body, e.g., with the openings being formed adjacent outer ends of the first and second slots. A portion of the main body can be folded to form a lid for the carton.

Other advantages and novel features of the invention will become apparent from the following detailed description of various non-limiting embodiments when considered in conjunction with the accompanying figures and claims.

BRIEF DESCRIPTION OF THE DRAWINGS

Aspects of the invention are described with reference to the following drawings in which numerals reference like elements, and wherein:

FIG. 5 is a front view of the egg carton;

FIG. 6 is a top view of the egg carton;

DETAILED DESCRIPTION

It should be understood that aspects of the invention are described herein with reference to certain illustrative embodiments and the figures. The illustrative embodiments described herein are not necessarily intended to show all aspects of the invention, but rather are used to describe a few illustrative embodiments. Thus, aspects of the invention are not intended to be construed narrowly in view of the illustrative embodiments. In addition, it should be understood that aspects of the invention may be used alone or in any suitable combination with other aspects of the invention. For example, carton forming machines are described below for forming a particular carton arrangement described here, but such machines and forming methods can be used with other carton types or configurations. Likewise, carton arrangements described herein can be formed in a variety of different ways and not necessarily using the methods and/or machines described.

Figure 1:
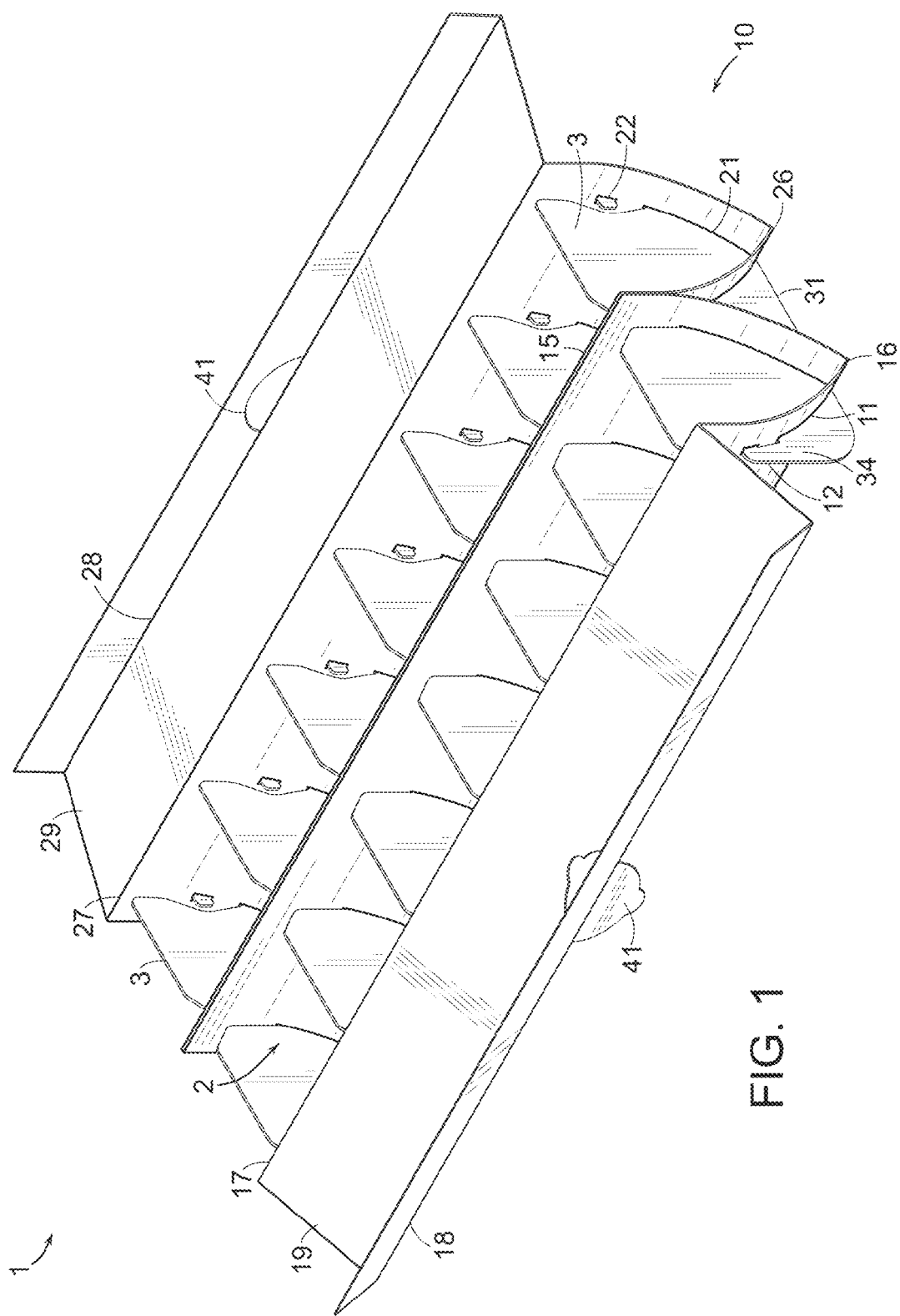
FIG. 1 is top perspective view of an egg carton in an illustrative embodiment having lid portions in an open position.
Figure 2:
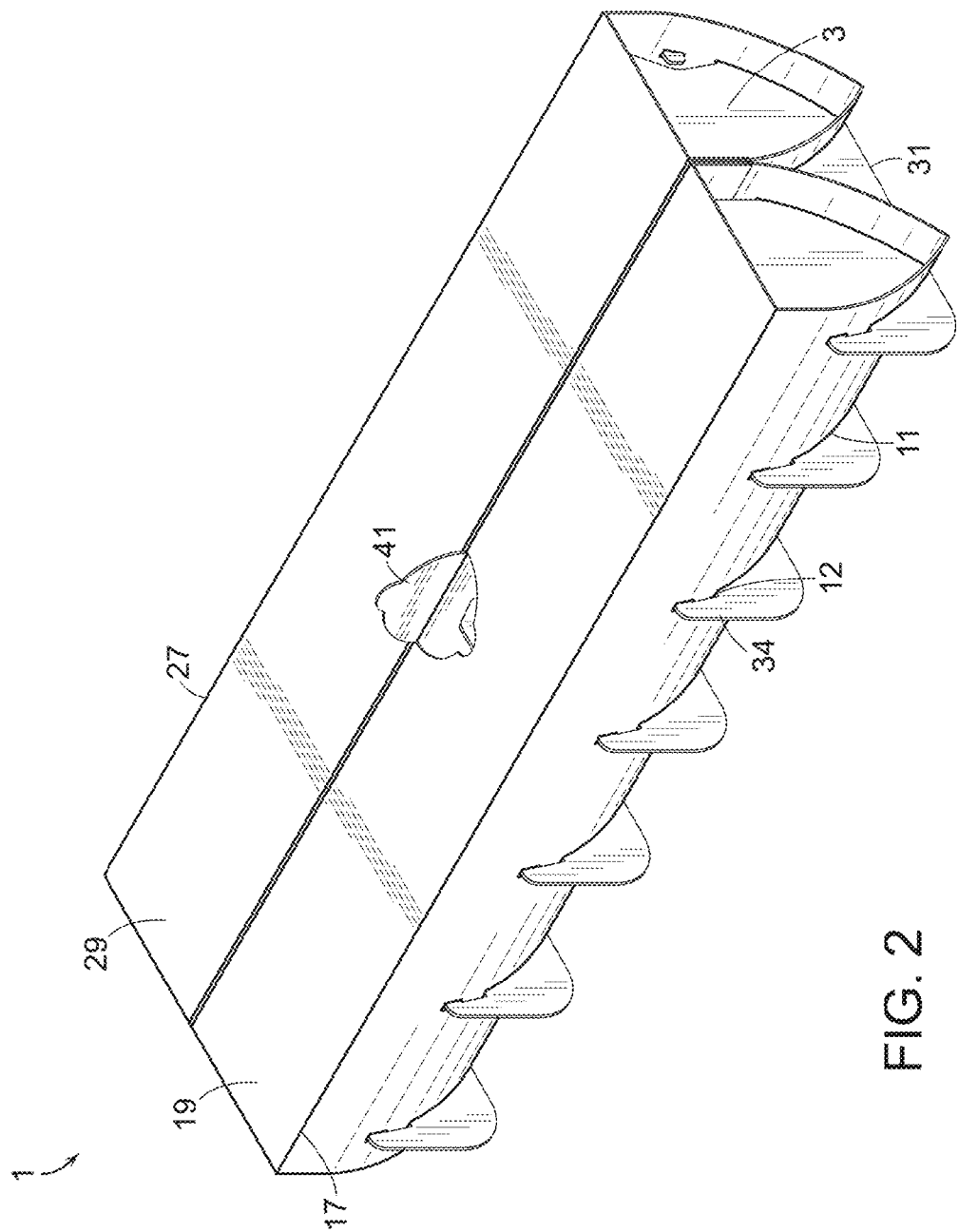
FIG. 2 is a top perspective view of the egg carton with lid portions in a closed position.

FIG. 1 shows a top perspective view of an egg carton 1 with first and second lid portions 19, 29 in an open position, thereby exposing an interior space 2 of the egg carton 1. The egg carton 1 includes a main body sheet 10 and a plurality of partition walls 3 that define the interior space 2 and/or help define separate storage areas of the interior space 2. In this embodiment, the main body sheet 10 is folded or otherwise bent to define a "W" shape as viewed from an end of the carton 1 so that the interior space 2 includes two parallel channels each having a "U" or "V" shape. The partition walls 3 may be arranged so that separate storage areas are defined to hold a single egg or other item, although other arrangements are possible, e.g., the partition walls 3 may have openings, grooves or other features that define continuous channel sections rather than defining separate storage areas in the channels. The partition walls 3 may engage with the main body 10 to help hold the main body 10 in the "W" shape, as discussed more below. FIG. 2 shows the egg carton 1 with the first and second lid portions 19, 29 in a closed position, and thus enclosing the interior space 2 as well as any eggs or other items held in the interior space 2. The lid portions 19, 29 may have one or more finger openings or tabs 41 to provide a user with a convenient location to grasp or otherwise interact with to move the lid portions 19, 29 to the open position and/or the closed position. In some embodiments, the lid portions 19, 29 can be eliminated, or only one lid portion 19, 29 can be provided which can cover all or a part of the interior space 2.

Figure 3:
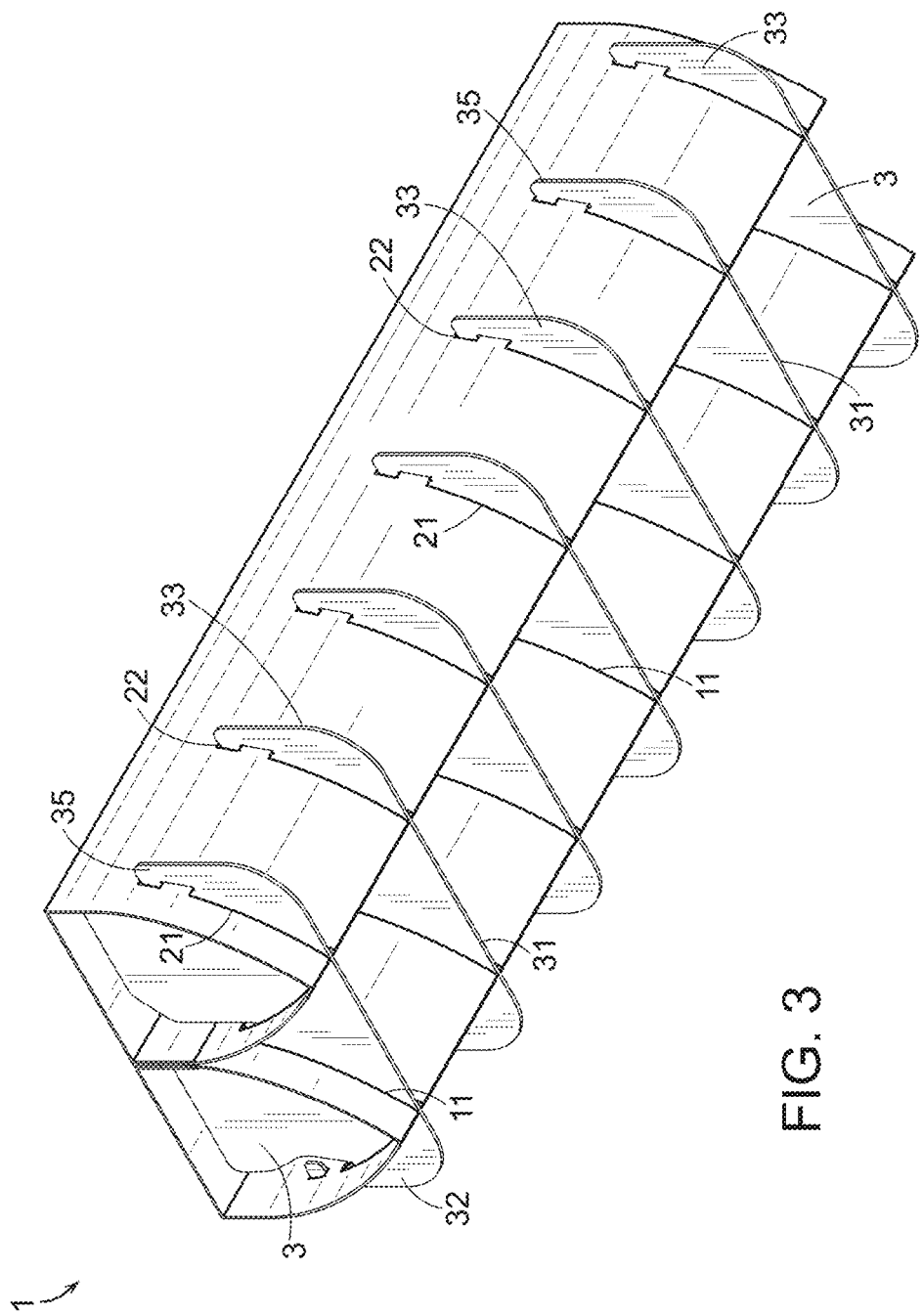
FIG. 3 is a bottom perspective view of the egg carton.
Figure 7:
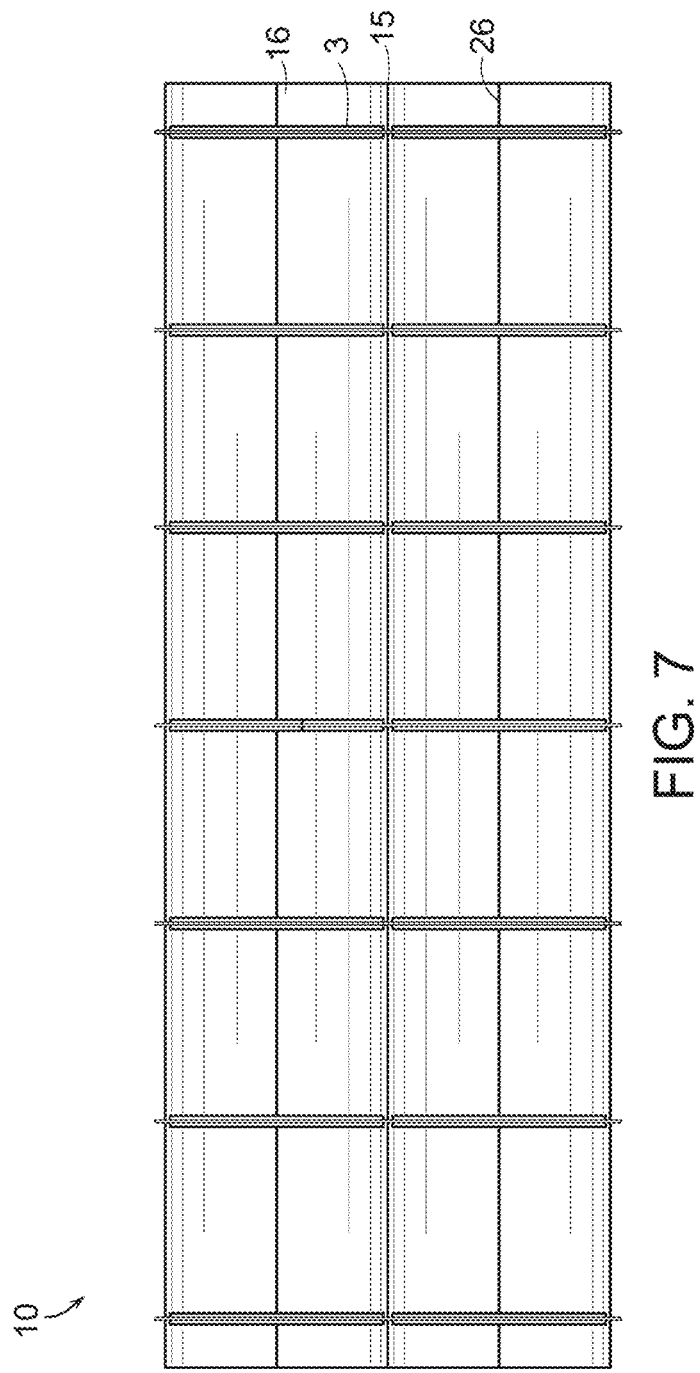
FIG. 7 is a bottom view of the egg carton.

As can be seen in FIG. 3, the partition walls 3 may extend through first and second slots 11, 21 of the main body 10 and define a bottom surface of the egg carton 1, e.g., a bottom 31 of the partition walls 3 can be exposed below the main body 10 to support the carton 1 on a table top or other surface on which the egg carton 1 is placed. As can also be seen in FIGS. 4 and 5, lower portions of the first and second sides 32, 33 of the partition walls 3 may extend downwardly and/or outwardly from first and second slots 11, 21 of the main body sheet 10. Thus, the bottom 31 and the lower portions of the first and second sides 32, 33 can be located outside of the interior space 2 of the carton 1. First and second hooks 34, 35 at the sides 32, 33 of the partition walls 3 may engage with corresponding first and second openings 12, 22 in the main body sheet 10 to secure the main body 10 to the partition walls 3. As can be seen in FIGS. 6 and 7, in this embodiment the hooks 34, 35 extend outwardly (e.g., horizontally or laterally) beyond the side edges 17, 27 of the lid portions 19, 29, although in other embodiments the hooks 34, 35 and/or other parts of the first and second sides 32, 33 of the partition walls 3 need not extend beyond the outer edges of the lid portions 19, 29. As described more below, engagement of the hooks 34, 35 with the main body sheet 10 may help hold corresponding parts of the main body 10 inwardly towards a centerline of the egg carton 1, e.g., to help maintain the "W" shape of the main body 10.

Figure 8:
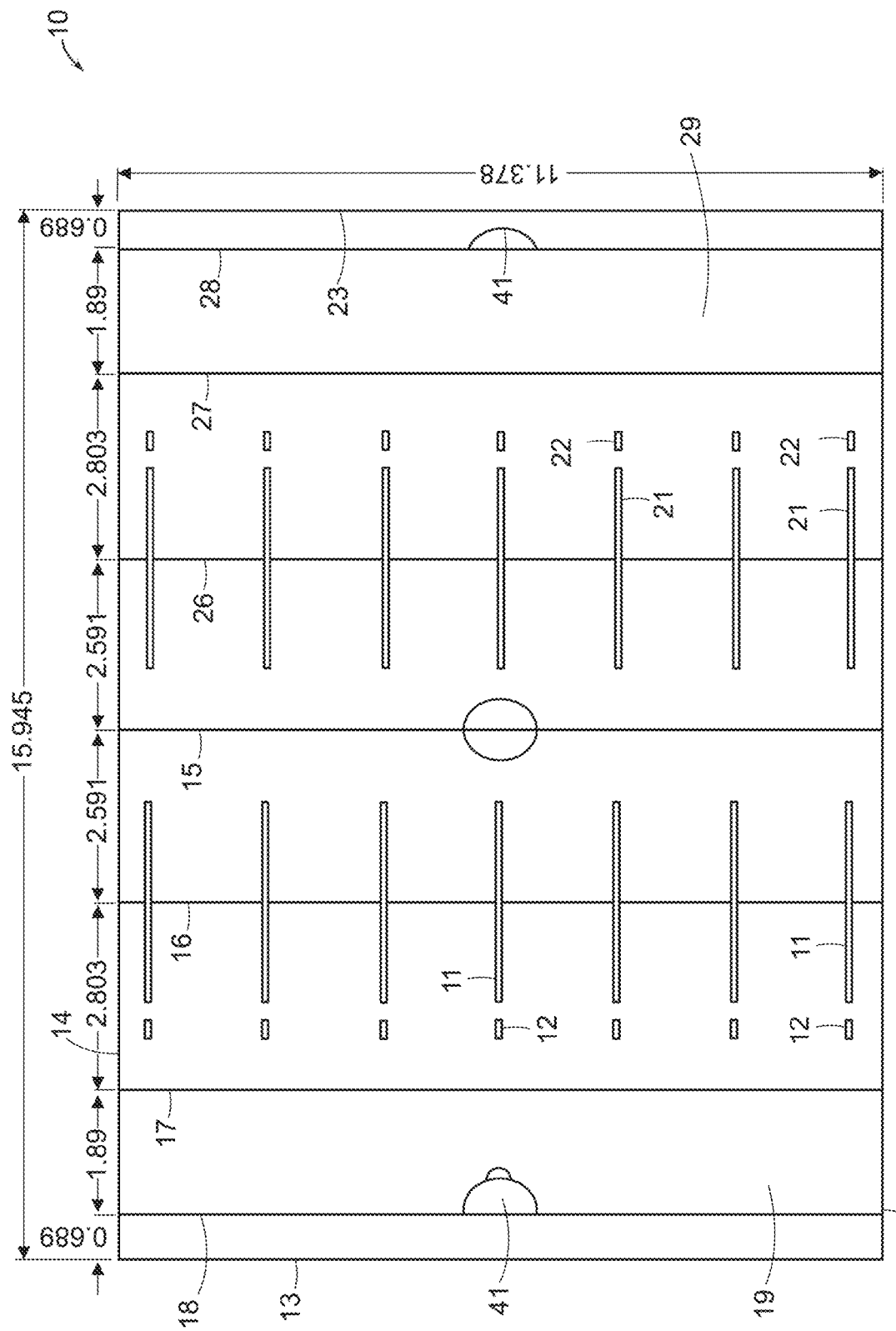
FIG. 8 shows the main body sheet of the egg carton in a flat condition.

In this illustrative embodiment, the egg carton 1 is formed of multiple sheet elements, e.g., a single main body sheet 10 and multiple partition walls 3. FIG. 8 shows a main body 10 that may be used to form the egg carton 1 shown in FIGS. 1-7, and in this embodiment has a rectangular shape with first and second side edges 13, 23 and first and second end edges 14, 24. The main body 10 may be formed of a single sheet of material such as cardboard, other paperboard material, plastic, or other suitable material. The main body 10 has a center fold line 15 that is positioned near a center of the main body 10 and is parallel to the first and second side edges 13, 23. As with other fold lines, the center fold line 15 may include a scoring, a line of weakness, a perforation, a thinned area, or other feature that aids in forming a bend or fold along the line 15 when the main body sheet 10 is bent. However, this is not required, and instead a fold line such as the center fold line 15 may have a marking (e.g., printing or other visible indication) where the fold line is located, or may include no marking at all. Also, a fold line may be an area or region of the sheet, rather than a line, where a fold or bend is located, e.g., where the main body 10 is bent or curved across a relatively wide area to form a continuous, smooth curve rather than creased at a sharp, angular bend along a single line.

In this embodiment, the main body 10 includes a first bottom fold line 16 between the center fold line 15 and the first side edge 13, and a first upper fold line 17 between the first bottom fold line 16 and the first side edge 13. Similarly, the main body has a second bottom fold line 26 between the center fold line 15 and the second side edge 23, and a second upper fold line 27 between the second bottom fold line 26 and the second side edge 23. These fold lines 16, 17, 26 and 27 are parallel to the center fold line 15. Thus, the main body has a first inner panel between the first bottom fold line 16 and the center fold line 15, and a first outer panel between the first upper fold line 17 and the first bottom fold line 16. Likewise, the main body has a second inner panel between the second bottom fold line 26 and the center fold line 15, and a second outer panel between the second upper fold line 27 and the second bottom fold line 26. The main body 10 has the first and second lid portions 19, 29 between the first upper fold line 17 and the first side edge 13, and between the second upper fold line 27 and the second side edge 23, respectively. In this embodiment, the first and second lid portions 19, 29 additionally include a first and second lid fold lines 18, 28, respectively. This can allow the first and second lid portions 19, 29 to be folded inwardly at the lid fold lines 18, 28, as discussed more below.

A plurality of first slots 11 are each formed in the first inner and outer panels of the main body 10 and extend parallel to the first and second end edges 14, 24. The plurality of first slots 11 are each formed in between the center fold line 15 and the first upper fold line 17 such that each of the plurality of first slots 11 extends across the first bottom fold line 16. Similarly, a plurality of second slots 21 are each formed in the second inner and outer panels of the main body 10 and extend parallel to the first and second end edges 14, 24. The plurality of second slots 21 are each formed in between the center fold line 15 and the second upper fold line 27 such that each of the plurality of second slots 21 extends across the second bottom fold line 26. A plurality of first openings 12 is formed in the first outer panel and located between a corresponding one of the plurality of first slots 11 and the first upper fold line 17. Similarly, a plurality of second openings 22 is formed in the second outer panel and located between a corresponding one of the plurality of second slots 21 and the second upper fold line 27. As discussed above, the first and second slots 11, 21 are arranged to receive the partition walls 3, which pass through the slots 11, 21, and the first and second openings 12, 22 are arranged to engage with the hooks 34, 35 of the partition walls 3.

Figure 9:
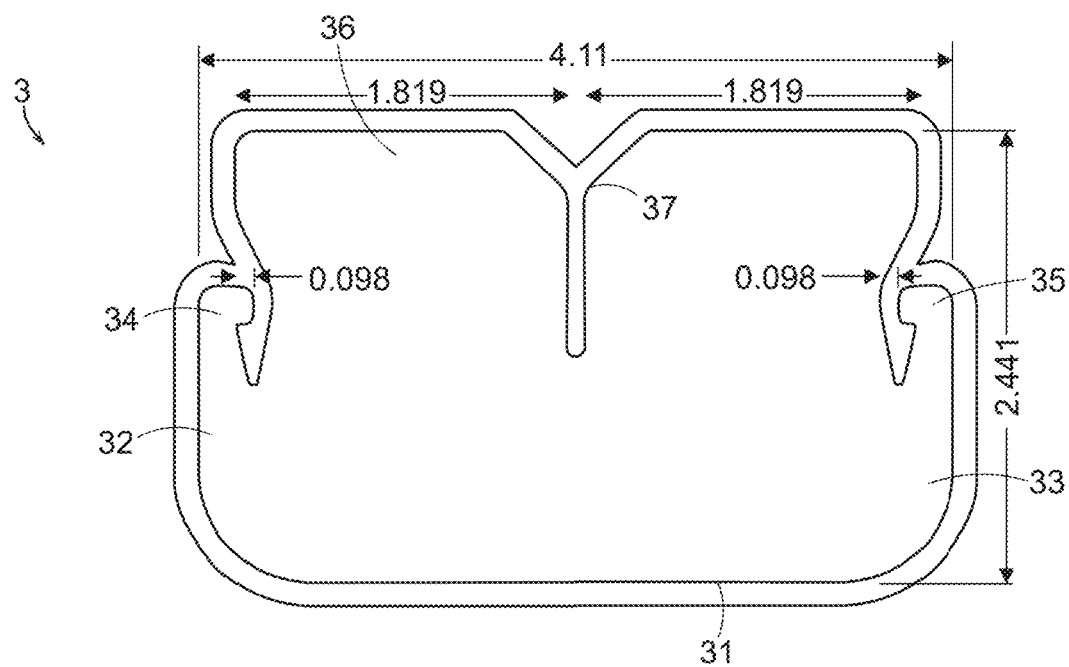
FIG. 9 shows a partition wall of the egg carton.

FIG. 9 shows a partition wall 3 used in the FIGS. 1-7 embodiment, and like the main body 10 may be made from a sheet of any suitable material such as cardboard, paperboard, plastic, etc. Each partition wall 3 has a bottom 31, first and second sides 32, 33, and a top 36. The first and second sides 32, 33 each have a respective first and second hook 34, 35 and the top 36 has a groove 37 that extends from the top 36 toward the bottom 31. The first and second hooks 34, 35 may be formed in various ways, and in this embodiment extend generally upwardly along a corresponding side 32, 33 of the partition wall 3. A gap or space is defined between a distal end of each hook 34, 35 so that a portion of the main body 10 between a first or second slot 11, 21 and a corresponding first or second opening 12, 22 can be received into the gap or space. This can allow the hook 34, 35 to extend around the portion of the main body 10 between a corresponding slot 11, 21 and opening 12, 22, and allow the distal end of the hook 34, 35 to suitably engage (e.g., extend through) a corresponding opening 12, 22.

The main body 10 and the partition walls 3 of FIGS. 8 and 9 can be assembled to form the FIGS. 1-7 egg carton 1 as follows. Portions of the main body 10 on opposite sides of the center fold line 15 may be folded downwardly at the center fold line 15 to form a vertically-oriented 180 degree bend, e.g., so that the first and second inner and outer panels extend downwardly from the center fold line 15 and are adjacent each other. In this condition, the first and second slots 11, 21 may be aligned with each other. As a result, each of the partition walls 3 may be positioned within (e.g., inserted into) a corresponding aligned pair of the first and second slots 11, 21 such that a portion of the vertically-oriented 180 degree bend is received into the groove 37 of the partition wall 3. Alternately, the 180 degree bend can be formed so that the first and second slots 11, 21 are located on opposed sides of the 180 degree bend and so that a top 36 of partition walls 3 can be inserted from below the 180 degree bend into a corresponding pair of first and second slots 11, 21 so that the 180 degree bend is received into the groove 37. This configuration in which a portion of the vertically-oriented 180 degree bend is received into the groove 37 can be seen, for example, in FIGS. 1 and 4. By receiving the 180 degree bend into the groove 37 of the partition walls 3, the partition walls 3 may help keep the 180 degree bend from opening during subsequent or concurrent manipulation of the inner and outer panels of the main body 10.

Figure 4:
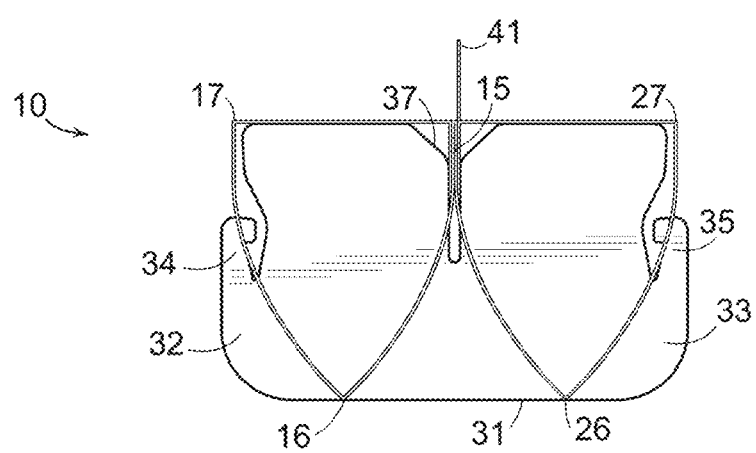
FIG. 4 is an end view of the egg carton.

Next, or concurrently with insertion of partition walls 3 into corresponding slots 11, 21, the main body 10 may be folded upwardly at the first and second bottom fold lines 16, 26 such that the first inner and outer panels define a concave-up shape, and such that the second inner and outer panels define a concave-up shape. In other words, the main body 10 may be folded to form the "W" shape that can be seen in FIGS. 1 and 4. For example, as can be seen in FIG. 4, the first and second inner panels extend downwardly from the center fold line 15 to the first and second bottom fold line 16, 26, respectively, and the first and second outer panels extend upwardly from the first and second bottom fold line 16, 26, respectively. Although in this embodiment the main body 10 is folded at the first and second bottom fold lines 16, 26 to form a sharp angle, this fold may form a more gentle and continuous curve, e.g., a curve that mimics the general shape of part of an egg. When bending of the main body 10 at the first and second bottom fold lines 16, 26 is complete, the bottom 31 of each of the partition walls 3 may be located below the main body 10, e.g., below the lowermost part of the main body 10 at the first and second bottom fold lines 16, 26. Said another way, the bottom 31 of the partition walls 3 may be positioned outside of the interior space 2 of the egg carton defined by the inner and outer panels of the main body 10. This can be seen in FIGS. 3 and 4, for example, and allows the partition walls 3 to define a bottom surface of the egg carton 10. In addition, the lower sections of the first and second sides 32, 33 of the partition walls 3 may be positioned outside of the interior space 2, e.g., so the first and second hooks 34, 35 of each of the partition walls 3 are positioned outside of the interior space 2. This can be seen in FIG. 4.

As noted above, the first and second hooks 34, 35 may engage with the main body 10 to position the first and second outer panels relative to the partition walls 3 so the interior space 2 maintains its size and shape. Specifically, an end of the first and second hooks 34, 35 of each partition wall 3 may be engaged with a corresponding first and second opening 12, 22 so that the first or second outer panel is engaged with the partition wall 3 at the hook 34, 35. Thus, the first and second hooks 34, 35 may engage the first and second outer panels of the main body 10, respectively, so as to resist movement of the first and second outer panels away from the vertically-oriented 180 degree bend. To engage the hooks 34, 35 with a corresponding opening 12, 22, the first and second outer panels may be manipulated so that the outermost end of a slot 11, 21 is received into a gap or space between a corresponding hook 34, 35 and the body of the partition wall 3. This receives the outermost end of the slot 11, 21 into the gap or space between the hook 34, 35 and the partition wall 3 so that the outermost end of the slot 11, 21 engages with the bottom of the gap or space. This positions the corresponding opening 12, 22 so that the distal end of the hook 34, 35 can be inserted into and through the corresponding opening 12, 22 to be positioned in the interior space 2, as can be seen in FIG. 4. As a result, the first inner and outer panels and the second inner and outer panels may define the "W" shape and so that the interior space 2 has an upper opening, e.g., via which eggs or other items can be placed into the interior space 2.

With the hooks 34, 35 engaged with a corresponding opening 12, 22, the main body 10 may be folded inwardly at the first and second upper fold lines 17, 27 so that the first and second lid portions 19, 29 are positioned over, or close, the upper opening to the interior space 2. Although not required, the lid portions 19, 29 may include a lid fold line 18, 28 at which the lid portions 19, 29 may be folded inwardly and/or downwardly so that the first and second side edges 13, 23 are received into the interior space 2 of the egg carton. For example, the first and second side edges 13, 23 may be received into the groove 37 of the partition walls 3, and may be engaged at the groove 37 so that the side edges 13, 23 are frictionally held in place to retain the lid portions 19, 29 in the closed position. This is shown in FIG. 4. As can be seen in FIG. 9, the groove 37 may flare outwardly and upwardly at the top 36 of the partition wall 3. This may aid in receiving the side edges 13, 23 into the groove 37, as well as aid in receiving the 180 degree bend of the main body 10 at the center fold line 15 into the groove 37.

Figure 10:
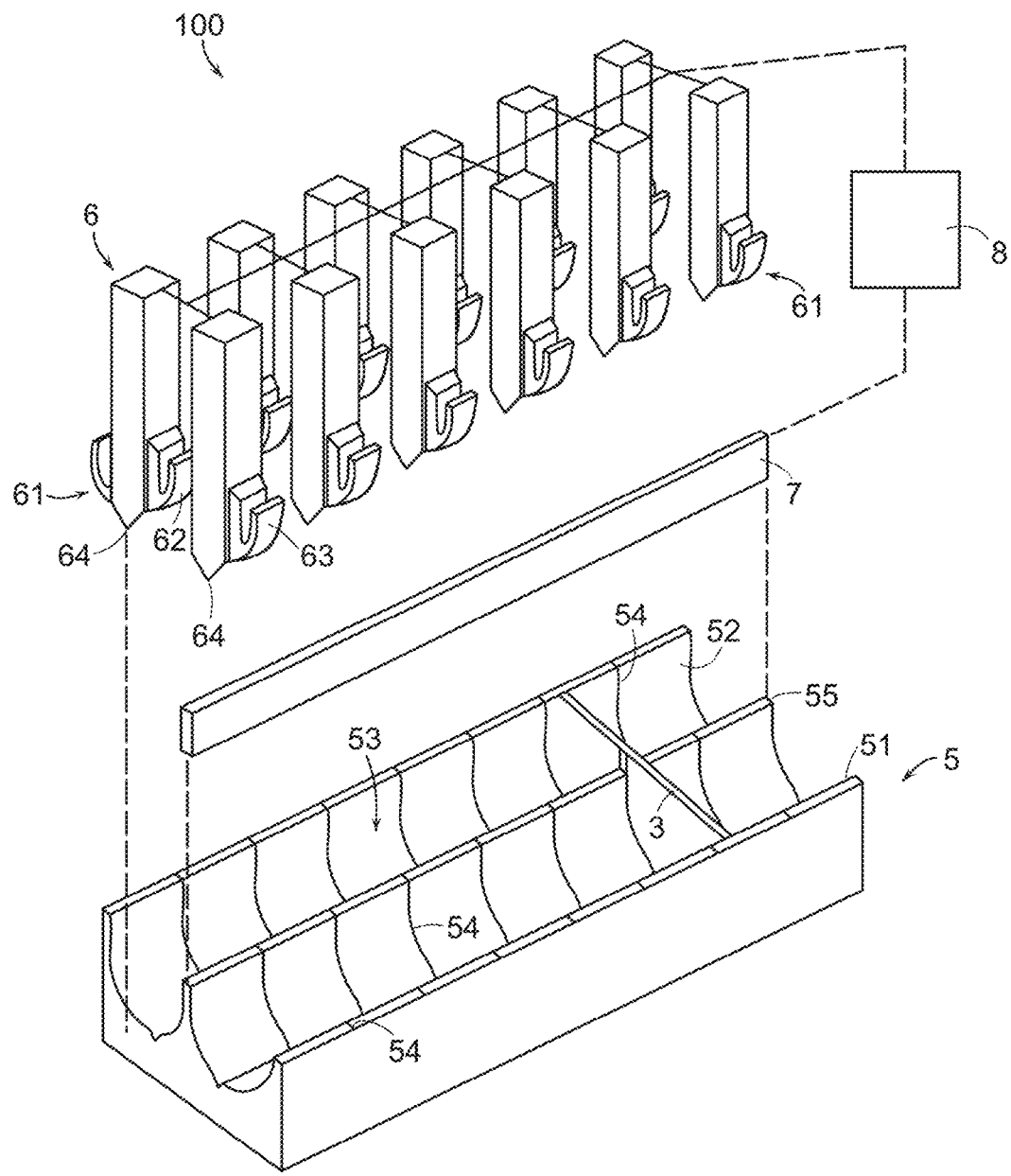
FIG. 10 is a perspective view of a carton forming machine in an illustrative embodiment.

FIG. 10 is a perspective view of a carton forming machine 100 that can be used to form the carton in FIG. 1, as well as other carton arrangements. In this embodiment, the machine 100 includes a lower mold 5, an upper mold 6 and a folding bar 7. The lower mold 5 includes first and second sidewalls 51, 52 that are opposed to each other, extend in a longitudinal direction and define a cavity 53 of the lower mold 5. The lower mold 5 also includes a center wall 55 between the first and second sidewalls 51, 52 that extends in the longitudinal direction between first and second cavity portions of the cavity 53. In this embodiment, the center wall 55 with first and second sidewalls 51, 52 defines the cavity 53 to have a W-shape in a cross-section perpendicular to the longitudinal direction. Note, however, that in some embodiments the lower mold need not have a center wall 55, and instead can have the cavity 53 arranged to have a single U-shape in a cross-section perpendicular to the longitudinal direction. The first and second sidewalls 51, 52 and/or the center wall 55 can have channels 54 that extend between the first and second sidewalls 51, 52 across the cavity 53. The channels 54 can be arranged to receive a corresponding partition wall 3, e.g., one of which is shown in FIG. 10. Thus, a partition wall 3 can be arranged in each channel 54, e.g., so a groove 37 of the partition wall 3 is positioned over the center wall 55. The partition walls 3 can fit snugly in the channels 54, e.g., in some embodiments the partition walls 3 can be clamped in place in a corresponding channel 54. For example, in some embodiments the lower mold 5 can include multiple segments arranged so that adjacent segments are separable from each other at a channel 54. This can allow the segments to be separated from each other, e.g., so the channels 54 are relatively wide in the longitudinal direction, so a partition wall 3 can be received in the channels 54. Thereafter, the segments can be moved toward each other so that the partition walls 3 are clamped in the channels 54. In other embodiments, the lower mold 5 can have movable elements arranged to move to allow a partition wall 3 to be placed in a channel 54 and then move to clamp the partition wall in the channel 54.

The upper mold 6 can have one or more insertion portions 61 arranged to move into the cavity 53, e.g., to push a main body 10 of a carton 1 into the cavity 53 such that partition walls 3 in the plurality of channels 54 are received through a corresponding slot 11, 21 in the main body 10. In this embodiment, the upper mold 6 has fourteen insertion portions 61, each with an inner resilient portion 62, an outer resilient portion 63 and a lowermost portion 64. First insertion portions 61 can be arranged to be received into a first cavity portion (e.g., on a first side of the center wall 55), and second insertion portions 61 can be arranged to be received into a second cavity portion (e.g., on a second side of the center wall 55). The first and second insertion portions 61 can be separated by a gap into which a portion of the center wall 55 is received when the upper mold 6 is fully inserted into the cavity 53. In addition, adjacent ones of the first insertion portions can be arranged to receive a partition wall 3 between the adjacent ones of the first insertion portions 61 when the upper mold 6 is fully inserted into the cavity 53, and adjacent ones of the second insertion portions 61 can be arranged to receive a partition wall 3 between the adjacent ones of the second insertion portions 61 when the upper mold 6 is fully inserted into the cavity 53. Thus, in some arrangements, each insertion portion 61 can extend into a location of the cavity 53 where separate storage areas of the interior space 2 are defined by the partition walls 3.

The machine 100 can also include a folding bar 7 that extends in the longitudinal direction between the first and second sidewalls 51, 52. The folding bar 7 can be positioned over and be movable relative to the lower mold 5, e.g., in a vertical direction independently and/or together with the upper mold 6. In some embodiments, an actuator 8 can be arranged to move the folding bar 7 and/or the upper mold 6 relative to the lower mold 5, e.g., to position the folding bar 7 over the center wall 55 and in the grooves 37 of partition walls 3 and to extend the insertion portions 61 at least partially into the cavity 53. The folding bar 7 together with the upper mold 6 can be arranged to fold the main body 10 over the folding bar 7, e.g., at the center fold line 15, as the upper mold 6 pushes the main body 10 into the cavity 53. Thus, the folding bar 7 and the upper mold 6 can be arranged to fold the main body 10 over the folding bar 7 to form a vertically oriented 180-degree bend.

Figure 11:
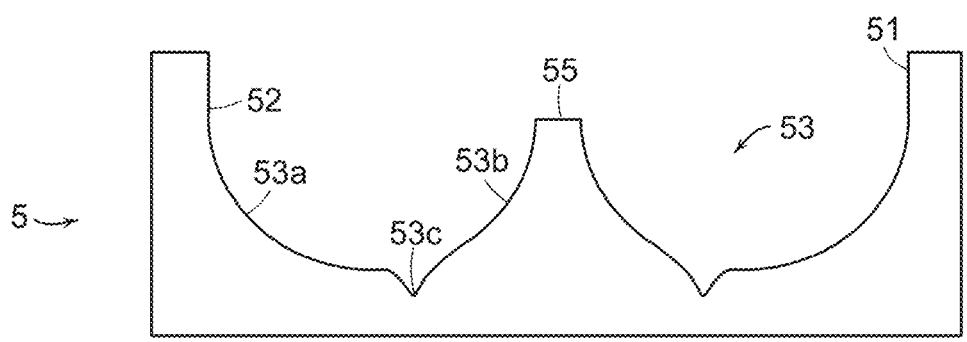
FIG. 11 is an end view of a lower mold of the FIG. 10 machine.

FIG. 11 shows an end view of the lower mold 5 of FIG. 10 and illustrates one possible shape for the cavity 53. In some embodiments, the cavity 53 has a "W" shape in a cross-section perpendicular to the longitudinal direction of the lower mold 5 as seen in FIG. 11. The first and second sidewalls 51, 52 are opposed to each other and define at least part of the shape of the cavity 53 together with the center wall 55. The first and second sidewalls 51, 52 can extend above a top of the center wall 55, as can be seen in FIG. 11. The first and second portions of the cavity 53 can have an approximately "U" shape with an outer portion 53a, an inner portion 53b and a lowermost portion 53c. The outer portion 53a can have an approximately vertical part near a top of the first or second sidewall 51, 52, and a lower curved part, e.g., having a radius of about 1.5 inches although other radii or other shapes are possible. The inner portion 53b can have a curved part, e.g., having a radius of about 1.25 inches although other radii and/or other shapes than partial circular are possible. The lowermost portion 53c can have a "V" shape with a depth of about 0.2 inches although other shapes and sizes are possible.

Figure 12:
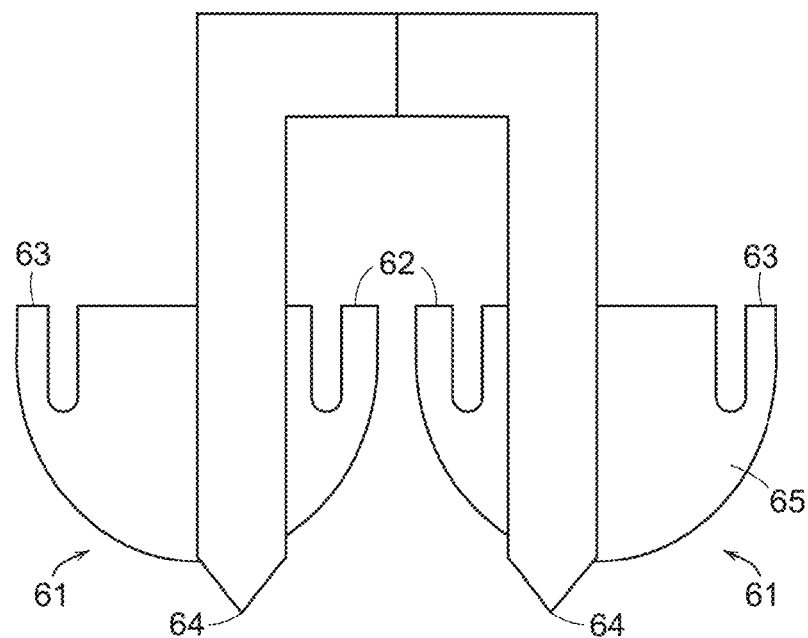
FIG. 12 is an end view of an upper mold of the FIG. 10 machine.

FIG. 12 shows an end view of the upper mold 6 of FIG. 10 and illustrates an arrangement for the insertion portions 61. Each insertion portion 61 can have inner and outer resilient elements 62, 63, e.g., each arranged to contact at least a part of the cavity 53 wall when the upper mold 6 is fully inserted into the cavity 53. For example, each outer resilient element 63 can be arranged to contact a respective sidewall 51, 52 portion of the lower mold 5, and each the inner resilient element 62 can be arranged to contact a portion of the center wall 55 when the upper mold 6 is fully inserted into the cavity 53. This can help press the main body 10 of the carton into selected areas of the cavity 53, e.g., to help the main body 10 adopt a desired shape. In some embodiments, the inner and outer resilient elements 62, 63 can be made as cantilevers attached to a body of the insertion portion 61 by a living hinge or other part that allows the cantilever to flex as desired and with a desired resilient force to be applied to the cavity wall that is contacted. In this embodiment, the resilient elements 62, 63 are formed by vertical slots arranged generally chordwise in an approximately semi-circular disc (e.g., having a diameter of about 1.75 inches), e.g., made of a polyacetal polymer, metal, composite or other. Of course, other arrangements are possible, e.g., the resilient elements 62, 63 can be formed by elements that are pin-hinged to the insertion portion body and biased by a spring. The lowermost portion 64 of the insertion portion 61 can have a pointed end or inverted "V" shape, e.g., to fit at least partially in the lowermost portion 53c of the cavity 53. This can help the insertion portion 61 push a part of the main body 10 of the carton (e.g., at the first and second bottom fold lines 16, 26) into the lowermost portion 53c of the cavity 53. Note that the insertion portion 61 need not necessarily have a same shape as the portion of the cavity 53 into which the insertion portion 61 moves. Instead, the insertion portion 61 can be designed to have a limited number of points or areas of contact with the cavity 53, such as one each at the first or second sidewall 51, 52, the center wall 55 and the lowermost portion 53c. This can help reduce friction between the main body 10 and the upper and lower molds 5, 6 and/or avoid unwanted marking or other damage to the main body 10 during the carton forming process.

Figure 13:
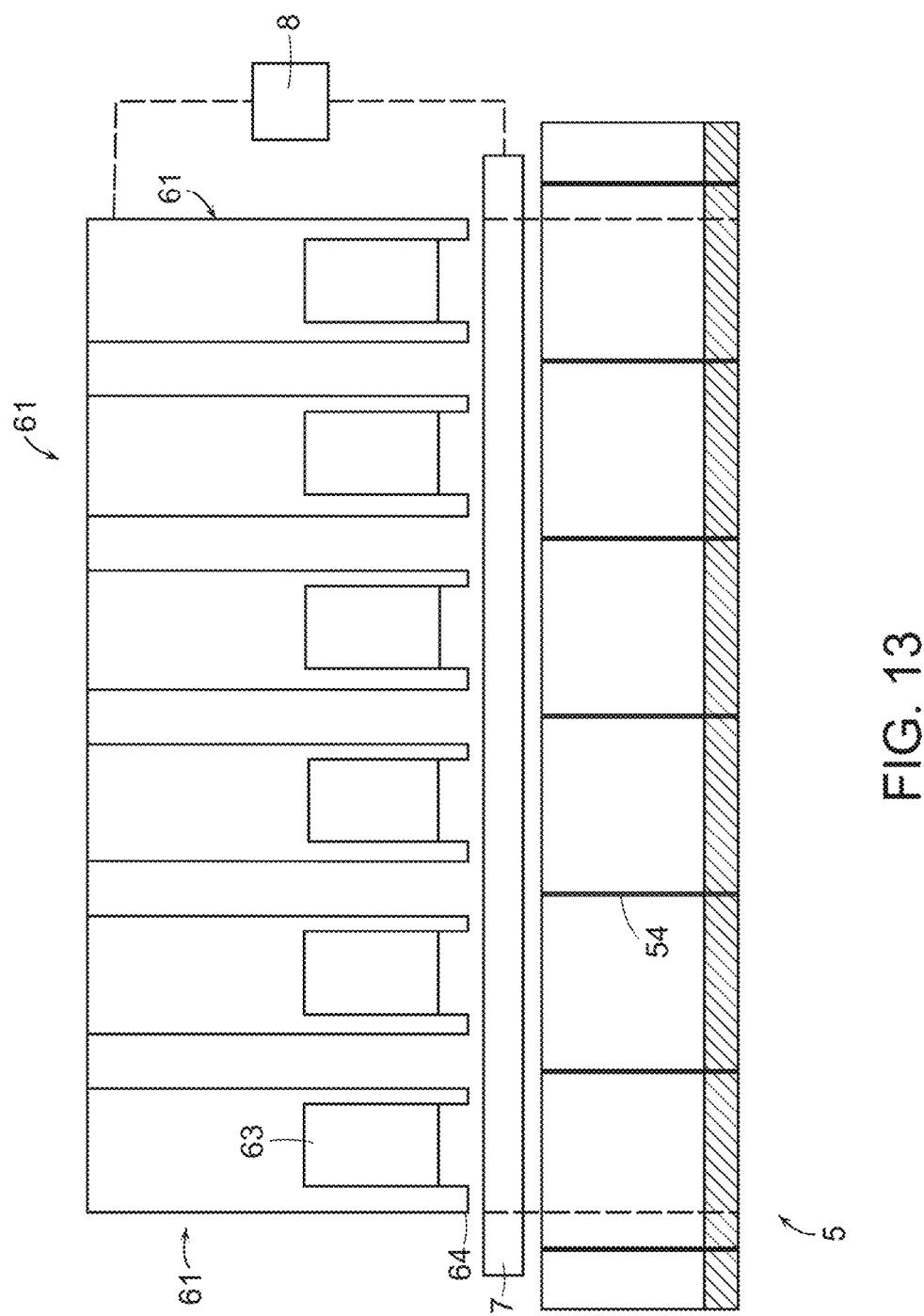
FIG. 13 is a side view of the FIG. 10 machine.

FIG. 13 shows a side view of the machine 100 and illustrates how each insertion portion 61 can be arranged to be inserted into a part of the cavity 53 between channels 54, e.g., so adjacent insertion portions 61 have a partition wall 3 positioned between them when the insertion portion 61 is fully inserted into the cavity 53. FIG. 13 also shows that each insertion portion 61 can be arranged to have a pair of lowermost portions 64 positioned on either side of a body (e.g., a semi-circular disc) that includes the resilient elements 62, 63. Thus, the insertion portion 61 can have a fork-shaped element with two tines or parts that define the lowermost portions 64 and sandwich the semi-circular disc or other body that carries the resilient elements 62, 63. Upper ends of the insertion portions 61 can be connected together and coupled to the actuator 8 so the insertion portions 61 can be moved together relative to the folding bar 7 and the lower mold 5.

Figure 14:
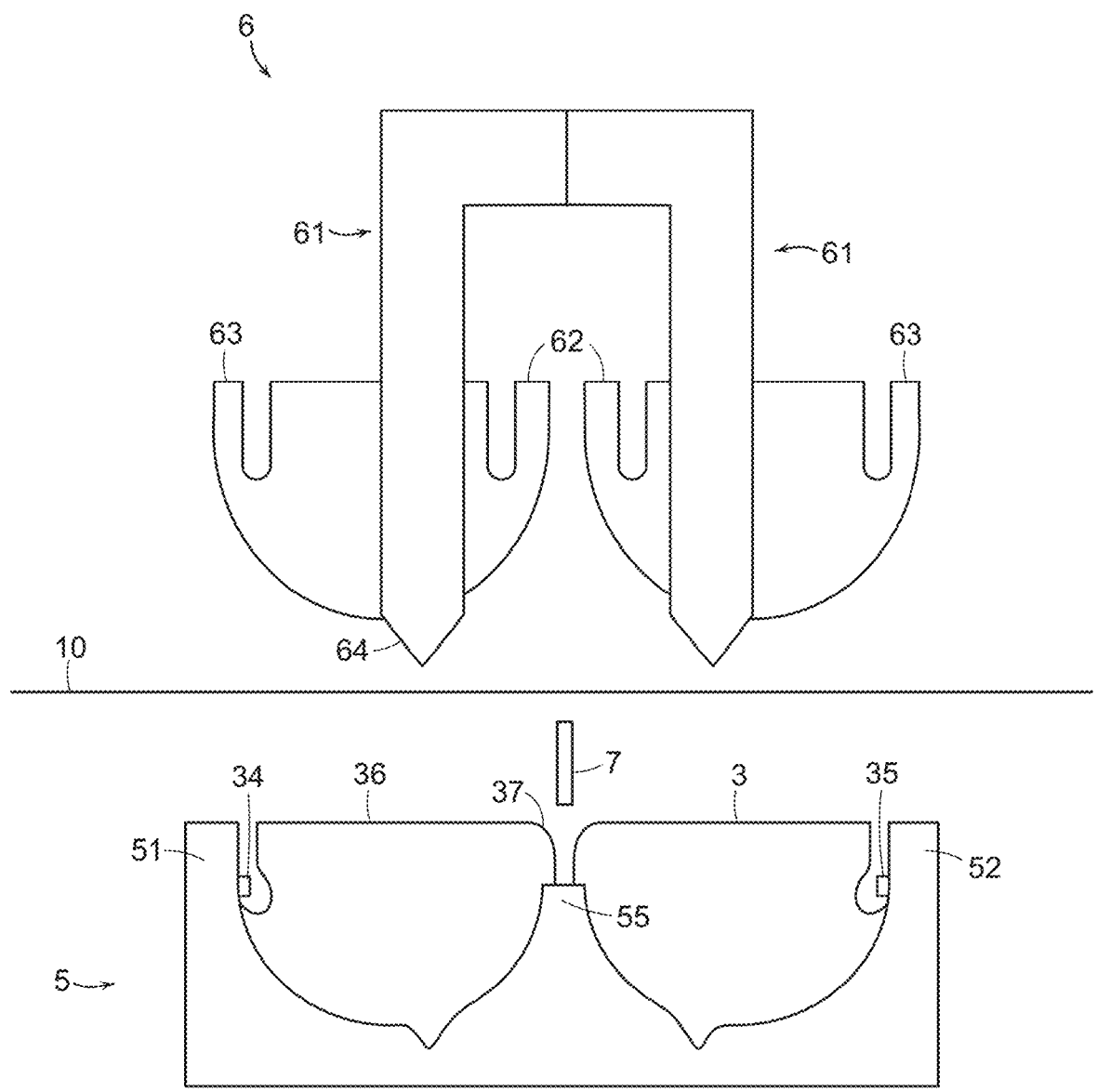
FIG. 14 is an end view of the FIG. 10 machine at the start of a carton forming operation.
Figure 15:
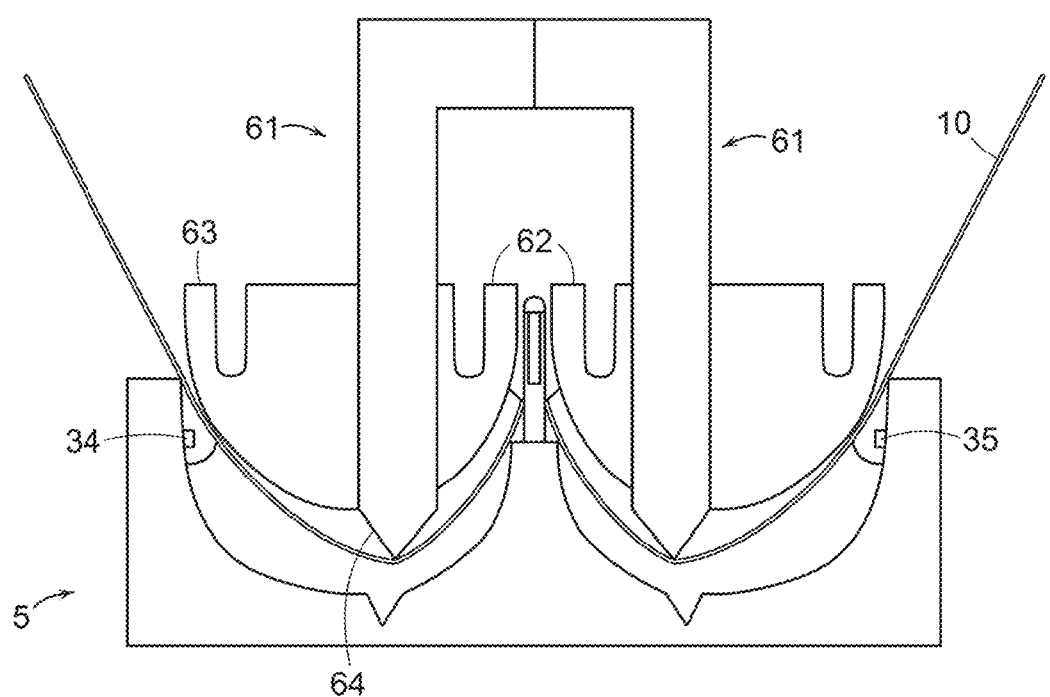
FIG. 15 is an end view of the FIG. 10 machine mid-way through the carton forming operation.
Figure 16:
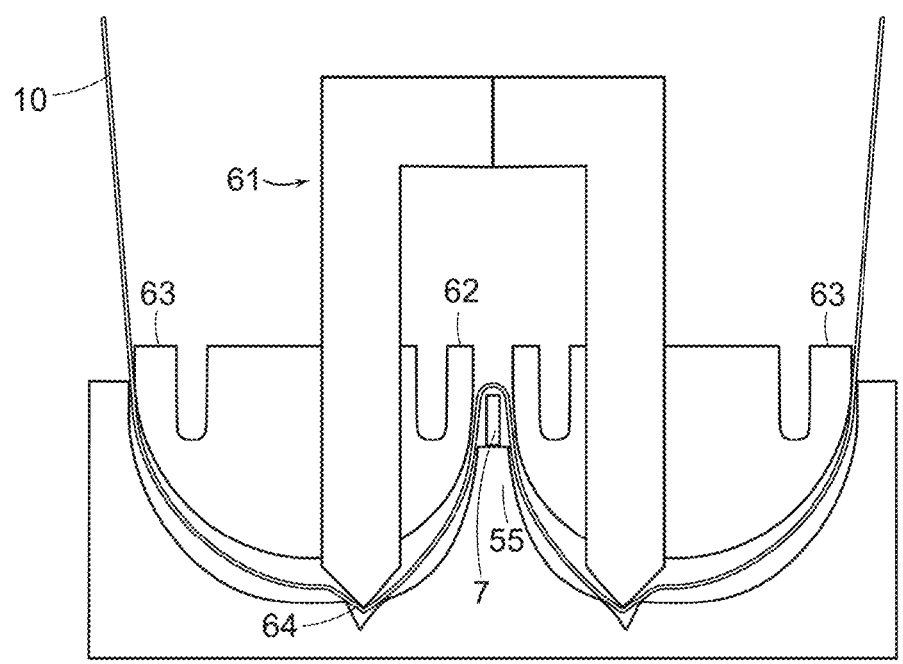
FIG. 16 is an end view of the FIG. 10 machine at a point in the carton forming operation when the upper mold is fully inserted into the lower mold.

FIGS. 14-16 show selected steps in a carton forming operation using the machine 100 of FIG. 10. In this embodiment, a carton like that shown in FIG. 1 is formed, using the main body 10 and partition walls 3 shown in FIGS. 8 and 9. As shown in FIG. 14, partition walls 3 are arranged in each channel 54 of the lower mold 5, e.g., seven partition walls 3 are arranged in seven channels 54 of the lower mold 5. The lower mold 5 and partition walls 3 are arranged so that the groove 37 is positioned over the center wall 55 and the top 36 is at about an uppermost part of the first and second sidewalls 51, 52, although the top 36 can sit higher or lower relative to the uppermost extent of the first and second sidewalls 51, 52. Also, the first and second hooks 34, 35 of the partition walls 3 extend inwardly from a respective sidewall 51, 52, and the gap or space between each hook 34, 35 and the partition wall body is exposed near a top of the respective first or second sidewall 51, 52. The main body 10 is positioned over the folding bar 7 and under the upper mold 6, e.g., with the center fold line 15 aligned with the folding bar 7. The main body 10 can be flat and planar at this point and can be held in place relative to the machine 100 parts by stops or other components (not shown). Thus, the main body 10 is arranged so the plane of the main body 10 is perpendicular to the direction in which the main body 10 is inserted into the cavity 53 of the lower mold 5 and perpendicular to the partition walls 3. The folding bar 7 is positioned above and spaced from the center wall 55 and the groove 37 of the partition walls 3.

As shown in FIG. 15, the upper mold 6 initially moves toward the lower mold 5 while the folding bar 7 remains stationary. This movement, and control of the relative movement of the upper mold 6 and folding bar 7, is caused by the actuator 8 which can include any suitable drive motors, transmissions, linkages, sensors, controllers, etc. As an example, the upper mold 6 can be moved by a pneumatic or other fluid-driven cylinder actuator, and movement of the upper mold 6 can be guided by vertical channels or other guideways. Downward movement of the upper mold 6 causes the partition walls 3 to extend into the first and second slots 11, 21 of the main body 10, and causes the main body 10 to be folded over the folding bar 7 at the center fold line 15 to form a vertically oriented 180 degree bend or fold. In some embodiments, the inner resilient elements 62 of opposed insertion portions 61 can cooperate to press the main body 10 on opposed sides of the center fold line 15 toward the folding bar 7, e.g., to help form the 180 degree bend to have a desired shape. This action can also hold parts of the first and second inner panels suitably near each other so the 180 degree bend can be received into the grooves 37 of the partition walls 3. As also shown in FIG. 15, the lowermost part 64 of the insertion portions 61 contacts the main body 10 to push the main body 10 into the cavity 53.

This pulls outer sections of the main body 10 into the cavity 53 at the tops of the first and second sidewalls 51, 52. This helps to draw the portion of the main body 10 between the outer ends of the slots 11, 21 and corresponding openings 12, 22 into the gap or space between the hooks 34, 35 and the body of the partition wall 3.

As shown in FIG. 16, the upper mold 6 continues movement toward the lower mold 5. After the 180 degree bend is formed and arranged for receipt into the grooves 37, the folding bar 7 begins movement with the upper mold 6 and continues to move with the upper mold 6 until the folding bar 7 is positioned over the center wall 55 and the 180 degree bend is received into the grooves 37. Thus, the folding bar 7 can be arranged to move with the upper mold in a portion of a range of movement of the upper mold toward the lower mold. In some cases, the folding bar is spring or resiliently biased to move upwardly relative to the lower mold 5, and the upper mold 6 is arranged to contact the folding bar 7 during its downward movement and cause the folding bar 7 to move with the upper mold 6 against the resilient bias when pushing the main body 10 into the cavity 53. When the upper mold 6 is fully inserted into the lower mold 5, the lowermost portions 64 of the insertion portions 61 press a part of the main body 10 (e.g., at the first and second bottom fold lines 16, 26) into the lowermost portion 53c of the cavity 53. Also, the portions of the main body 10 between the outer ends of the slots 11, 21 and corresponding openings 12, 22 is now positioned below a respective hook 34, 35 and each of the openings 12, 22 receives a respective hook 34, 35. The outer resilient elements 63 aid in this process by pushing outwardly on the main body 10 in areas near where the openings 12, 22 receive a respective hook 34, 35. This engages the main body 10 with the partition walls 3 so that the main body 10 maintains the "W" shape shown in FIG. 1. The upper mold 6 can be withdrawn from the lower mold 5 and the formed carton 1 removed thereafter. Additional processing can be performed to fold the main body 10 at the first and second upper fold lines 17, 27 and lid lines 18, 28, e.g., using known techniques.

Figure 17:
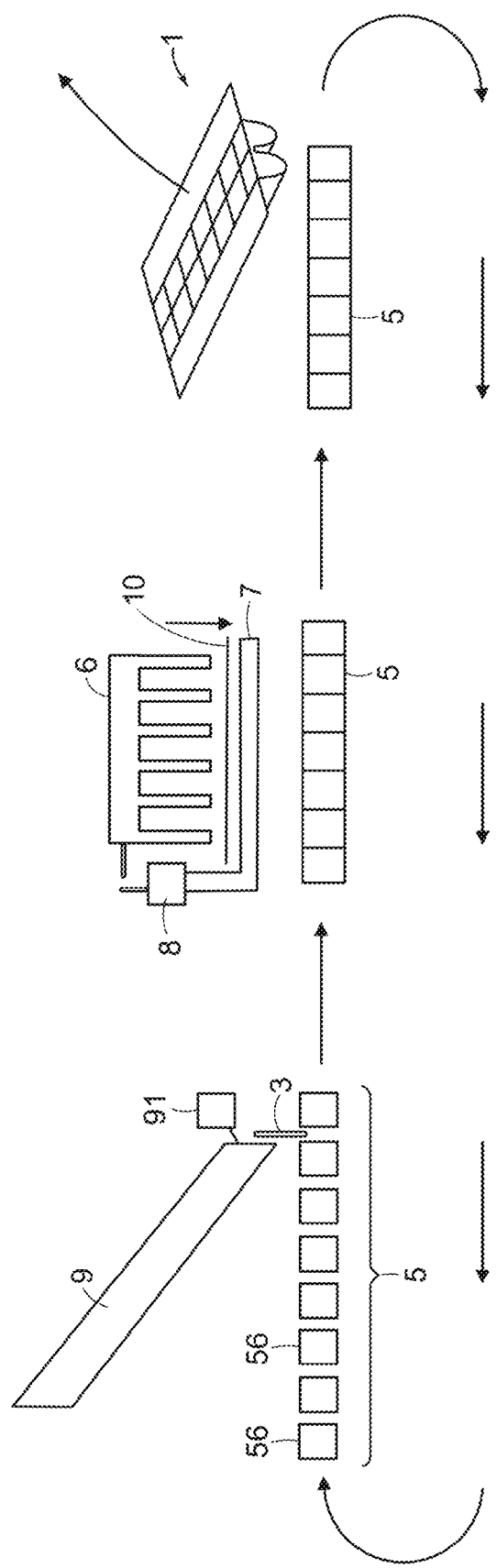
FIG. 17 is a schematic diagram of a carton assembly system.

The carton forming machine 100 described in connection with FIGS. 10-16 can be operated in a manual, semi-automated and/or fully automated fashion to form cartons. For example, main body sheets 10 can be supplied to the machine 100 by hand, and the upper mold 6/folding bar 7 moved by hand to form cartons. In other cases, carton components can be provided and cartons formed in a completely automated way. As an example, FIG. 17 shows a schematic view of one automated assembly arrangement. In some embodiments, one or more lower mold components can be arranged on a conveyor, e.g., one or more endless chain drives. The lower molds can be formed to each have multiple segments 56, e.g., where a partition wall is provided between each lower mold segment. FIG. 17 shows this arrangement schematically with multiple lower mold components 56 spaced apart so that partition walls 3 can be provided in an automated way, e.g., by a partition feeder 91 that provides a partition wall 3 between each adjacent pair of lower mold segments 56. The partition feeder 91 can be arranged in any suitable way, e.g., including a robotic or other actuator that picks and places individual partition walls 3 from a chute 9 or other supply. With partition walls 3 positioned between lower mold segments 56, the segments 56 can be moved together to clamp the walls 3 in place and position the clamped partition walls 3 below an upper mold 6 and folding bar 7. A main body 10 can be provided to the upper mold 6 and folding bar 7, e.g., by a suitable sheet feeder, and the main body 10 inserted into the lower mold 5 by the upper mold 6, e.g., as discussed above in connection with FIGS. 14-16. Thereafter, the upper mold 6 can be withdrawn upwardly while the folding bar 7 remains in place. The lower mold 5 is then moved laterally (e.g., to the right in FIG. 17) to remove the carton 1 from the folding bar 7 (i.e., to withdraw the folding bar 7 from within the 180 degree bend of the main body 10). With the carton 1 removed from the lower mold 5, the lower mold segments 56 can cycle back to begin a next carton forming process.

Control of the carton forming machine or other assembly system can be performed by any suitable control circuitry or controller, which can include a programmed general purpose computer and/or other data processing device along with suitable software or other operating instructions, one or more memories (including non-transient storage media that may store software and/or other operating instructions), a power supply for the control circuitry and/or other system components, position, movement, pressure or other sensors, input/output interfaces (e.g., such as a user interface to display information to a user and/or receive input from a user related to machine operation), communication buses or other links, a display, switches, relays, triacs, motors, mechanical linkages and/or actuators, or other components necessary to perform desired input/output or other functions.

While aspects of the invention have been described with reference to various illustrative embodiments, such aspects are not limited to the embodiments described. Thus, it is evident that many alternatives, modifications, and variations of the embodiments described will be apparent to those skilled in the art. Accordingly, embodiments as set forth herein are intended to be illustrative, not limiting. Various changes may be made without departing from the spirit of aspects of the invention.

The invention claimed is:

1. An egg carton comprising:
  a main body formed from a sheet of material, the sheet having first and second side edges and first and second end edges, the sheet further having
    a center fold line parallel to the first and second side edges,
    a first bottom fold line between the center fold line and the first side edge, the main body having a first inner panel between the first bottom fold line and the center fold line,
    a second bottom fold line between the center fold line and the second side edge, the main body having a second inner panel between the second bottom fold line and the center fold line, the first and second bottom fold lines being parallel to the center fold line,
    a first upper fold line between the first bottom fold line and the first side edge, the main body having a first outer panel between the first upper fold line and the first bottom fold line,
    a second upper fold line between the second bottom fold line and the second side edge, the main body having a second outer panel between the second upper fold line and the second bottom fold line, the first and second upper fold lines being parallel to the center fold line,
    a plurality of first slots formed in the sheet and extending parallel to the first and second end edges, the plurality of first slots being formed in the first inner and outer panels between the center fold line and the first upper fold line, each of the plurality of first slots extending across the first bottom fold line, a plurality of second slots formed in the sheet and extending parallel to the first and second end edges, the plurality of second slots being formed in the second inner and outer panels between the center fold line and the second upper fold line, each of the plurality of second slots extending across the second bottom fold line, a plurality of first openings formed in the first outer panel and located between a corresponding one of the plurality of first slots and the first upper fold line, and a plurality of second openings formed in the second outer panel and located between a corresponding one of the plurality of second slots and the second upper fold line, and a plurality of partition walls each formed from a sheet of material and having a bottom, first and second sides, and a top, the first and second sides each having a respective first and second hook, and the top having a groove extending from the top toward the bottom, wherein the plurality of partition walls and the main body are configured such that with the plurality of partition walls assembled with the main body to form the egg carton, the plurality of partition walls are secured against downward vertical movement relative to the main body only by engagement of the first and second hooks with a corresponding one of the plurality of first or second openings.

2. The egg carton of claim 1, wherein the main body is folded downwardly at the center fold line to form a vertically-oriented 180 degree bend, each of the plurality of partition walls positioned within a corresponding one of the first and second slots such that a portion of the vertically-oriented 180 degree bend is received in the groove.

3. The egg carton of claim 2, wherein main body is folded upwardly at the first and second bottom fold lines such that the first inner and outer panels define a concave-up shape, and such that the second inner and outer panels define a concave-up shape.

4. The egg carton of claim 3, wherein the bottom of each of the partition walls is located below the main body.

5. The egg carton of claim 3, wherein a distal end of each of the first and second hooks of each of the partition walls extends laterally inwardly through the corresponding first or second opening to engage with the corresponding first or second opening.

6. The egg carton of claim 5, wherein portions of the first outer panel between the first openings and the first slots are each positioned in a gap defined by a corresponding first hook engaged with the corresponding first opening and portions of the second outer panels between the second openings and the second slots are each positioned in a gap defined by a corresponding second hook engaged with the corresponding second opening, respectively, so as to resist movement of the first and second outer panels away from the vertically oriented 180-degree bend.

7. The egg carton of claim 3, wherein the first inner and outer panels and the second inner and outer panels define an interior space, and wherein the bottom and lower sections of the first and second sides of the partition walls are positioned outside of the interior space.

8. The egg carton of claim 7, wherein the first and second hooks of each of the partition walls are positioned outside of the interior space and have an end of the first and second hooks extend laterally inwardly through a corresponding first or second opening and into the interior space.

9. The egg carton of claim 8, wherein the first and second hooks each receive a corresponding portion of the first outer panel or the second outer panel in a gap between the first and second hooks and a body of the partition wall to engage the first and second outer panels, respectively, so as to resist movement of the first and second outer panels away from the vertically oriented 180-degree bend.

10. The egg carton of claim 3, wherein the first inner and outer panels and the second inner and outer panels define an interior space having an upper opening, and wherein the main body is folded inwardly at the first and second upper fold lines to define first and second lid portions positionable over the upper opening.

11. The egg carton of claim 10, wherein the first and second lid portions additionally include a lid fold line, and the first and second lid portions are folded inwardly at the lid fold lines such that the first and second side edges are received into the groove of the plurality of partition walls.

12. The egg carton of claim 11, wherein the groove of the plurality of partition walls flares outwardly and upwardly at the top of the partition wall.

13. The egg carton of claim 3, wherein the bottoms of the plurality of partition walls define a bottom surface of the egg carton.

14. The egg carton of claim 3, wherein an outermost end of each first slot and an innermost end of each first opening is received into a gap between a corresponding first hook and partition wall, and an outermost end of each second slot and an innermost end of each second opening is received into a gap between a corresponding second hook and partition wall, and an end of the first and second hooks of each of the partition walls is respectively engaged with the corresponding first and second opening.

15. An egg carton comprising:
a main body formed from a sheet of material, the sheet having first and second side edges and first and second end edges, the sheet further having
a center fold line parallel to the first and second side edges,
a first upper fold line between the center fold line and the first side edge, the main body having a first outer panel and a first inner panel between the first upper fold line and the center fold line,
a second upper fold line between the center fold line and the second side edge, the main body having a second outer panel and a second inner panel between the second upper fold line and the center fold line, the first and second upper fold lines being parallel to the center fold line,
a plurality of first slots formed in the sheet and extending parallel to the first and second end edges, the plurality of first slots being formed in the first inner and outer panels between the center fold line and the first upper fold line,
a plurality of second slots formed in the sheet and extending parallel to the first and second end edges, the plurality of second slots being formed in the second inner and outer panels between the center fold line and the second upper fold line,
a plurality of first openings formed in the first outer panel and located between a corresponding one of the plurality of first slots and the first upper fold line, a first portion of the first outer panel extending between an outermost end of each of the plurality of first slots and an innermost end of the corresponding one of the plurality of first openings, and a plurality of second openings formed in the second outer panel and located between a corresponding one of the plurality of second slots and the second upper fold line, a second portion of the second outer panel extending between an outermost end of each of the plurality of second slots and an innermost end of the corresponding one of the plurality of second openings, and a plurality of partition walls each formed from a sheet of material and having a bottom, first and second sides, and a top, the first and second sides each having a respective first and second hook, each of the plurality of partition walls received in a corresponding pair of first and second slots, the first and second hooks of each partition wall receiving a corresponding one of the first and second portions of the main body, respectively, in a gap between the first and second hooks and a body of the partition wall and having a distal end that extends laterally inwardly into a corresponding first or second opening, wherein the plurality of partition walls are secured against downward vertical movement relative to the main body by only engagement of the first and second hooks with the corresponding first or second opening.

16. The egg carton of claim 15, wherein the main body includes:
a first bottom fold line between the first inner panel and the first outer panel, and
a second bottom fold line between the second inner panel and the second outer panel, the first and second bottom fold lines being parallel to the center fold line.

17. The egg carton of claim 15, wherein the main body is folded downwardly at the center fold line to form a vertically-oriented 180 degree bend, each of the plurality of partition walls positioned within the corresponding pair of the first and second slots such that a portion of the vertically-oriented 180 degree bend is received in the groove.

18. The egg carton of claim 17, wherein main body is formed such that the first inner and outer panels define a concave-up shape, and such that the second inner and outer panels define a concave-up shape.

19. The egg carton of claim 18, wherein the bottom of each of the partition walls is located below the main body.

20. The egg carton of claim 15, wherein the distal end of each of the first and second hooks of each of the partition walls extends laterally inwardly through the corresponding first or second opening.

21. The egg carton of claim 20, wherein the first and second portions of the main body are engaged by the first and second hooks, respectively, so as to resist movement of the first and second outer panels away from the center fold line.

22. The egg carton of claim 15, wherein the first inner and outer panels and the second inner and outer panels define an interior space, and wherein the bottom and lower sections of the first and second sides of the partition walls are positioned outside of the interior space.

23. The egg carton of claim 22, wherein the first and second hooks of each of the partition walls are positioned outside of the interior space and have the distal end of the first and second hooks extend laterally inwardly through the corresponding first or second opening and into the interior space.

24. The egg carton of claim 15, wherein the first inner and outer panels and the second inner and outer panels define an interior space having an upper opening, and wherein the main body is folded inwardly at the first and second upper fold lines to define first and second lid portions positionable over the upper opening.

25. The egg carton of claim 24, wherein the first and second lid portions additionally include a lid fold line, and the first and second lid portions are folded inwardly at the lid fold lines such that the first and second side edges are received into the groove of the plurality of partition walls.

26. The egg carton of claim 25, wherein the groove of the plurality of partition walls flares outwardly and upwardly at the top of the partition wall.

27. The egg carton of claim 15, wherein the bottoms of the plurality of partition walls define a bottom surface of the egg carton.

* * * * *